United States Patent Office 3,350,397
Patented Oct. 31, 1967

3,350,397
4-AMINO-1-ALKYL-6-(5-NITRO-2-FURYL)-1H-PYRAZOLO[3,4-d]PYRIMIDINES
Homer Albert Burch, Norwich, N.Y., assignor to The Norwich Pharmacal Company, a corporation of New York
No Drawing. Filed July 20, 1965, Ser. No. 473,914
10 Claims. (Cl. 260—247.5)

ABSTRACT OF THE DISCLOSURE

Antibacterially active 4-substituted-1-alkyl-6-(5-nitro-2-furyl)-1H-pyrazolo[3,4-d]pyrimidines and methods for preparing them.

---

This application is a continuation-in-part of my copending application Ser. No. 390,207, filed Aug. 17, 1964, which is a continuation-in-part of my copending application Ser. No. 318,502, filed Oct. 24, 1963, and now abandoned.

This invention relates to nitrofuran compounds, methods for the preparation thereof and furan compounds useful in the preparation of the nitrofurans. More particularly, it is concerned with a series of 4-substituted-1-alkyl- or alkoxyalkyl-6-(5-nitro-2-furyl)-1H-pyrazolo[3,4-d]pyrimidines of the formula:

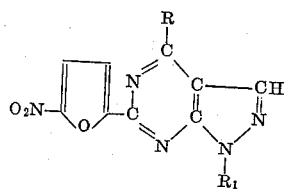

(I)

wherein R represents a member of the group consisting of hydroxy, chloro and

wherein X represents a member of the group consisting of hydrogen, (lower)alkyl, hydroxy(lower)alkyl, (lower)alkoxy(lower)alkyl and amino; Y represents a member of the group consisting of hydrogen, hydroxy(lower)alkyl, (lower)alkoxy(lower)alkyl and morpholinopropyl; X and Y taken together with N represent pyrrolidyl; and $R_1$ represents a member of the group consisting of (lower)alkyl and methoxyethyl. It is understood that, when R is hydroxy, the keto form is also contemplated in accordance with the usual tautomerism associated with such configuration, e.g.,

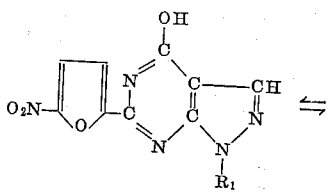

This invention is also concerned with furan compounds of the formula:

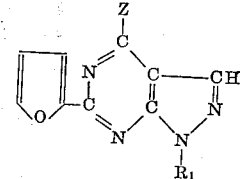

(II)

wherein Z represents a member of the group consisting of hydroxy and amino and $R_1$ has the aforestated significance useful in the preparation of the compounds of Formula I.

The compounds of Formula I are distinguished by their ability to inhibit the growth of bacteria. This effect extends to both gram-positive and gram-negative organisms. Representative of this effect is the compound 4-amino-1-methyl-6-(5-nitro-2-furyl) - 1H - pyrazolo[3,4-d]pyrimidine whose bacterial inhibitory propensity when tested by the commonly employed serial dilution technique is depicted below.

| Organism: | Minimum inhibiting concentration of compound in mg., percent |
|---|---|
| Staphylococcus aureus | 0.04 |
| Escherichia coli | 0.0024 |
| Salmonella typhosa | 0.02 |
| Streptococcus agalactiae | 0.04 |
| Erysipelothrix insidiosa | 0.0047 |

Thus, the compounds of Formula I are adapted to be combined with various carriers known to the art to form compositions designed to counteract bacterial growth. When so composed in the form of dusts, suspensions, ointments, tablets or the like, they may serve as disinfectant compositions for eradicating bacterial growth.

The compounds of Formula I wherein R is

are particularly noteworthy in that they are highly efficacious in suppressing bacterial infection in animals. Thus, when administered intraperitoneally or perorally to mice lethally infected by *Staphylococcus aureus*, protection is secured by dosages of these compounds in far less than host toxic amount. Effective intraperitoneal dosages of these compounds are as low as 0.18 mg./kg., while their $ED_{50}$ upon peroral administration ranges from about 10 to about 100 mg./kg.

The compounds of this invention may be prepared in a number of ways. Their synthesis is readily carried out using easily accessible raw materials and involves no unusual procedures. In the preparation of the amino compounds of Formulae I and II furonitrile and the appropriate 5-amino-4-cyano-1-alkylpyrazole are brought together in the presence of a solvent such as isopropanol and an alkaline condensing agent such as sodium methylate, advantageously under the influence of heat, until the reaction is complete, whereupon the reaction product is secured in conventional fashion, recrystallized, if desired, in customary fashion from solvents such as ethanol, isopropanol and aqueous mixtures thereof and then nitrated with a suitable nitrant such as mixed acid under appropriate conditions.

Alternatively, the amino compounds of Formulae I and II may be obtained by treating the corresponding chloro derivatives with amines in the presence of a solvent such as methanol or dimethylformamide advantageously under the influence of heat until the reaction is complete, whereupon the product is secured in conventional fashion by removal of solvent and/or cooling and said product, if desired, is crystallized using a suitable solvent such as

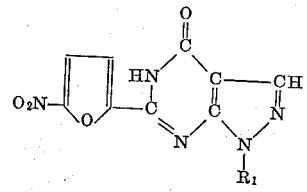

methanol, dimethylformamide or aqueous mixtures thereof.

In the preparation of the hydroxy compounds of Formulae I and II furoyl chloride and the appropriate 5-amino-4-cyano-1-alkylpyrazole are brought together in a suitable solvent such as pyridine, advantageously under the influence of heat, to prepare an N-(4-cyano-1-alkyl-5-pyrazolyl)-2-furamide which is recovered in customary fashion and subjected to an oxidizing agent such as hydrogen peroxide in the presence of a base and advantageously under the influence of heat to yield the 6-(2-furyl)-1-alkyl-1H-pyrazolo[3,4-d]pyrimidin-4(5H)-one which, upon nitration with a suitable nitrant such as mixed acid, is converted to the corresponding nitro compound.

In the preparation of the chloro compounds of Formula I the corresponding hydroxy compounds will serve as ready starting materials. Thus, the hydroxy compound may be subjected to the action of a halogenating agent such as phosphorus pentachloride, phosphorus oxychloride or mixtures thereof to accomplish replacement of the hydroxy group by chloro. The reaction is preferably conducted under the influence of heat and upon completion of the reaction a solvent such as petroleum ether is added and the mixture cooled, whereupon the precipitated product is recovered and recrystallized, if desired, from an appropriate solvent such as dimethylformamide or aqueous mixtures thereof.

In order that this invention may be readily available to and understood by those skilled in the art, the following illustrative examples of the preparation of the compounds thereof are supplied:

EXAMPLE I

*4-amino-1-methyl-6-(5-nitro-2-furyl)-1H-pyrazolo [3,4-d]pyrimidine*

(A) *4 - amino - 6 - (2 - furyl) - 1 - methyl - 1H - pyrazolo[3,4-d]pyrimidine.*—A mixture of 18.0 g. (0.19 mole) of 2-furonitrile, 23.0 g. (0.19 mole) of 5-amino-4-cyano-1-methylpyrazole [J. Org. Chem. 21:1240 (1956)] and 2.0 g. (0.037 mole) of sodium methylate in 350 ml. of isopropyl alcohol is refluxed overnight. After removing the solvents in vacuo on a steam bath, the residue is shaken with 300 ml. of cold water and filtered. Recrystallization of the residue from ethanol gives the product as colorless needles melting at 219.5–330.5° in a yield of 35.4 g. (87.3%). Further recrystallization raises the melting point to 220–221° C.

*Analysis.*—Calcd. for $C_{10}H_9N_5O$: C, 55.81; H, 4.22; N, 32.54. Found: C, 55.63, 55.55; H, 4.21, 4.17; N, 32.75, 32.64

(B) *4 - amino - 1 - methyl - 6 - (5 - nitro - 2 - furyl)-1H-pyrazolo[3,4-d]pyrimidine.*—A solution of 150 ml. of concentrated sulfuric acid is cooled to 0° C. and held near that temperature while 31.0 g. (0.144 mole) of (A) is added in small portions. A cooled solution of 15 ml. of concentrated nitric acid in 20 ml. of concentrated sulfuric acid is added dropwise below 10° C. during ca. 10 minutes. The mixture is then stirred in the cold for 0.5 hour, after which it is poured into 1 l. of ice water. Neutralization of the reaction mixture with sodium hydroxide solution causes the product to separate. The product is filtered and washed thoroughly with water to yield 20.6 g. (55%).

This may be recrystallized from dimethylformamide to give yellow needles decomposing at 344–346° C.

*Analysis.*—Calcd. for $C_{10}H_8N_6O_3$: C, 46.16; H, 3.10; N, 32.30. Found: C, 46.39; H, 3.14; N, 32.25.

EXAMPLE II

*4-amino-1-propyl-6-(5-nitro-2-furyl)-1H-pyrazolo [3,4-d]pyrimidine*

(A) *5-amino-4-cyano - 1 - propylpyrazole.*—A 2-l., 3-neck flask fitted with a stirrer, condenser and a dropping funnel, is charged with 90 g. (0.738 mole) of ethoxymethylenemalononitrile and 750 ml. of ethanol. n-Propyl hydrazine (44.5 g., 0.60 mole) is added dropwise with stirring. After the addition is complete, the solution is refluxed for 2 hours. The solvent is removed in vacuo on a steam bath. The residue is slurried in a minimum of benzene-petroleum ether (50/50 by vol.). The orange solid melting at 155–160° C. is collected by filtration in a yield of 40 g. (36%).

Recrystallization from isopropyl alcohol raises the melting point to 159–160° C. (corr.).

*Analysis.*—Calcd. for $C_7H_{10}N_4$: C, 55.98; H, 6.71; N, 37.31. Found: C, 56.03; H, 6.58; N, 37.03.

(B) *4 - amino - 6 - (2 - furyl) - 1 - propyl - 1H-pyrazolo[3,4-d]pyrimidine.*—A solution of 51 g. (0.55 mole) of 2-furonitrile, 81 g. (0.54 mole) of (A) and 10 g. of sodium methylate in 600 ml. of isopropyl alcohol is refluxed for 48 hours. The solvent is removed in vacuo on a steam bath, and the residue is shaken in 400 ml. of cold $H_2O$. The solids are filtered, washed with water, and recrystallized from dilute aqueous isopropyl alcohol from which the product separates as pale yellow needles melting at 173–175° C. (corr.) in a yield of 93.5 g. (71.4%). Further recrystallization raises the melting point to 184–185° C. (corr.).

*Analysis.*—Calcd. for $C_{12}H_{13}N_5O$: C, 59.25; H, 5.39; N, 28.79. Found: C, 59.28; H, 5.38; N, 28.59.

(C) *4 - amino - 6 - (5 - nitro - 2 - furyl) - 1 - propyl-1H-pyrazolo[3,4-d]pyrimidine.*—To 250 ml. of concentrated sulfuric acid, chilled to −5° C. in an ice-salt bath, is added in portions with stirring 29.5 g. (0.12 mole) of (B). A cold solution of 50 ml. of concentrated nitric acid in 50 ml. of concentrated sulfuric acid is added dropwise during about 20 minutes below 10° C. Stirring is continued in the cold for 1 hour. The mixture is poured into about 1 kg. of ice and the acid neutralized by the addition, in a slow stream, of cold potassium hydroxide solution. The final volume is adjusted to 5 l. The product is filtered, and it is washed thoroughly with cold water to remove any inorganic salts. A total of 59 g. (0.24 mole) of (B) is nitrated in this manner. The combined products are recrystallized from dimethylformamide to give the title product as yellow needles decomposing at 302–304° C. (corr.) in a yield of 27.1 g. (38.7%). Additional recrystallization raises the decomposition point to 306–307° C. (corr.).

*Analysis.*—Calcd. for $C_{12}H_{12}N_6O_3$: C, 49.99; H, 4.20; N, 29.16. Found: C, 50.22; H, 4.41; N, 29.14.

EXAMPLE III

*4-amino-1-ethyl-6-(5-nitro-2-furyl)-1H-pyrazolo [3,4-d]pyrimidine*

(A) *5-amino-4-cyano-1-ethylpyrazole.*—To a solution of 122 g. (1.0 mole) of ethoxymethylenemalononitrile in 1 l. of ethanol is added in portions 60 g. (1.0 mole) of ethyl hydrazine. When the exothermic reaction ceases, the solution is refluxed for 1 hour. The solvent is removed in vacuo on a steam bath. The residue is recrystallized from ethyl acetate-methanol solution (5:2 by volume) to give the product as colorless needles melting at 159–150° C. (corr.) in a yield of 49.5 g. The filtrate is chromatographed over alumina to give 65.9 g. of the product as tan crystals after evaporation of the solvent. The total yield is 115.4 g. (85%). For further purification is may be dissolved in ethyl acetate and chromatographed over alumina to raise the melting point to 163–163.5° C. (corr.).

*Analysis.*—Calcd. for $C_6H_8N_4$: C, 52.92; H, 5.92; N, 41.15. Found: C, 52.88; H, 6.00; N, 41.33.

(B) *4 - amino - 1 - ethyl - 6 - (2 - furyl) - 1H - pyrazolo[3,4-d]pyrimidine.*—A solution of 66 g. (0.70 mole) of 2-furonitrile, 95.6 g. (0.70 mole) of (A) and 70 g. of sodium methylate in 1.5 l. of isopropyl alcohol is refluxed for 48 hours The solvent is removed in vacuo on a steam bath, and the residue slurried in 1 l. of icewater. The crude product is filtered, washed thoroughly with water, and dried at 65° C. to give 153 g. (95.7%). Recrystallization of 93 g. from isopropyl alcohol gives the product as colorless platelets decomposing at 233–235° C. (corr.) in a yield of 61 g. (65.6% recovery). Additional recrystallization raises the decomposition point to 234–235° C. (corr.).

*Analysis.*—Calcd. for $C_{11}H_{11}N_5O$: C, 57.63; H, 4.84; N, 30.55. Found: C, 57.37; H, 4.99; N, 30.40.

(C) *4 - amino - 1 - ethyl - 6 - (5 - nitro - 2 - furyl)-1H-pyrazolo[3,4-d]pyrimidine.*—25 g. of (B) is added in portions with stirring to 250 ml. of concentrated sulfuric acid below 10° C. The temperature is lowered to —5° C. by means of an ice-salt bath and kept below 10° C. while a solution of 50 ml. of concentrated nitric acid in 50 ml. of concentrated sulfuric acid is added dropwise during 15 minutes. Stirring is continued in the cold for 1 hour. The mixture is poured over 1 kg. of ice, neutralized with sodium hydroxide solution, and diluted to a final volume of 5 l. The crude product is filtered, washed thoroughly with water to remove sodium sulfate, and air dried overnight. A total of 74 g. (0.32 mole) of (B) is nitrated in this manner. The combined products are recrystallized from dimethylformamide to give 4-amino-1-ethyl-6-(5-nitro-2-furyl) - 1H - pyrazolo[3,4-d]pyrimidine as yellow needles decomposing at 318–319° C. in a yield of 24.5 g. (27.7%). Additional recrystallization raises the decomposition point to 320–321.5° C. (corr.).

*Analysis.*—Calcd. for $C_{11}H_{10}N_6O_3$: C, 48.17; H, 3.68; N, 30.65. Found: C, 48.37; H, 3.94; N, 30.77.

EXAMPLE IV

*4-amino-1-(2-methoxyethyl)-6-(5-nitro-2-furyl)-1H-pyrazolo[3,4-d]pyrimidine*

(A) *5 - amino-4-cyano-1-(2-methoxyethyl)pyrazole.*—A 3-l., 3-neck flask, fitted with a stirrer, a dropping funnel, a condenser, and a thermometer, is charged with 1070 g. (21.4 moles) of 100% hydrazine hydrate. The solution is heated to 100° C. and the mantle is turned off. 2-methoxyethylchloride (Beil. 1, 337, I, 170, II, 335) (421 g., 4.46 moles) is added dropwise with stirring during 2.5 hours at 98–102° C. The resulting solution is heated for 10 hours at 105° C. and allowed to cool overnight. The product is isolated by a continuous ether extraction, during 5 days, of the crude reaction mixture. Evaporation of the ether leaves an oil which is distilled in vacuo through a Vigreux column. The fraction boiling at 83–90° C./56 mm. is collected giving a yield of 2-methoxyethylhydrazine of 316.9 g. (79%). Redistillation gives a boiling point of 84° C./50 mm., $n_D^{25.5}$ 1.4411.

*Analysis.*—Calcd. for $C_3H_{10}N_2O$: C, 39.98; H, 11.18; N, 31.08. Found: C, 39.85; H, 11.25; N, 30.81.

A solution of 152 g. (1.24 moles) of ethoxymethylenemalononitrile and 112 g. (1.24 moles) of 2-methoxyethylhydrazine in 1 l. of ethanol is refluxed for 24 hours. After removal of the solvents in vacuo the residue is taken up in boiling benzene, treated with charcoal, and filtered. Dilution of the filtrate with petroleum ether followed by thorough chilling precipitates 5-amino-4-cyano-1-(2-methoxyethyl)pyrazole as colorless platelets melting at 110–112° C. in a yield of 132 g. (64%). Recrystallization raises the melting point to 114–115° C. (corr.).

*Analysis.*—Calcd. for $C_7H_{10}N_4O$: C, 50.59; H, 6.07; N, 33.72. Found: C, 50.53; H, 6.14; N, 33.97.

(B) *4 - amino-6-(2-furyl)-1-(2 - methoxyethyl) - 1H-pyrazolo[3,4-d]pyrimidine.*—A solution of 84 g. (0.60 mole) of 2-furonitrile, 100 g. (0.60 mole) of (A) and 10 g. sodium methylate in 1.5 l. of isopropyl alcohol is refluxed for 48 hours. The solvent is removed in vacuo, and the residue is shaken with 1 l. of ice water. The crude product is filtered, washed with water and dried to give 122 g. (78.6%). Recrystallization of 40 g. from dilute aqueous ethanol gives colorless platelets melting at 192–193.5° C. (corr.) in a yield of 33.8 g.

*Analysis.*—Calcd. for $C_{12}H_{13}N_5O_2$: C, 55.59; H, 5.05; N, 27.02. Found: C, 55.68; H, 5.16; N, 27.23.

(C) *4 - amino - 1 - (2 - methoxyethyl)-6-(5-nitro-2-furyl)-1H-pyrazolo[3,4-d]pyrimidine.*—To 400 ml. of concentrated sulfuric acid chilled to 0° C. in an ice-salt bath is added in small portions with stirring 82.0 g. (0.32 mole) of (B) below 10° C. This is followed by the dropwise addition during 1 hour below 10° C. of 160 ml. of concentrated nitric acid in 160 ml. of concentrated sulfuric acid. Stirring is continued in the cold for 1 hour after which the solution is poured into 3 l. of ice water. The excess acid is neutralized by the addition of 20% sodium hydroxide solution. The crude product is filtered and washed thoroughly with water to removed inorganic salts. Recrystallization from dilute aqueous dimethylformamide gives 4-amino-1-(2-methoxyethyl)-6-(5-nitro-2-furyl)-1H-pyrazolo[3,4-d]pyrimidine as long yellow needles decomposing at 286–287° C. (corr.) in a yield of 32.3 g. (33.7%).

Additional recrystallization raises the decomposition point to 289.5–290.5° C. (corr.).

*Analysis.*—Calcd. for $C_{12}H_{12}N_6O_4$: C, 47.37; H, 3.98; N, 27.62. Found: C, 47.30; H, 4.06; N, 27.72.

EXAMPLE V

*1-methyl-6-(5-nitro-2-furyl)-1H-pyrazolo[3,4-d] pyrimidin-4(5H)-one*

(A) *N - (4-cyano-1-methyl-5-pyrazolyl)-2-furamide.*—To a solution of 91 g. (0.74 mole) of 5-amino-4-cyano-1-methylpyrazole in 300 ml. of pyridine is added with stirring 101 g. (0.74 mole) of furoyl chloride. After heating the solution on a steam bath for 1 hour, it is poured into 1 l. of ice water and allowed to stand overnight. The product is filtered, washed with cold water and dried at 65° C. to give a yield of 139.7 g. (88%), M.P. 170–172° C. (corr.). Recrystallization from dilute aqueous methanol gives the product as large colorless needles melting at 171–172.5° C. (corr.).

*Analysis.*—Calcd. for $C_{10}H_8N_4O_2$: C, 55.55; H, 3.73; N, 25.92. Found: C, 55.36; H, 4.04; N, 25.95.

(B) *6 - (2 - furyl) - 1 - methyl-1H-pyrazolo[3,4-d]pyrimidin-4(5H)-one.*—245 g. (1.13 moles) of (A) is added in small portions to a warm stirred solution of 230 ml. of 30% hydrogen peroxide and 62 g. of sodium hydroxide in 2700 ml. of water. A few ml. of ethyl acetate is added periodically to control frothing. The solution is then heated on a steam bath under reflux for 20 hours, chilled and neutralized with glacial acetic acid. The solids are filtered, washed with cold water and dried at 65° C. to give 167 g. of crude product. The pulverized, crude product is stirred for several minutes in acetonitrile (500 ml.), filtered, and the residue dried at 65° C. This separation process is repeated until an infrared spectrum of the solids shows an absence of a nitrile band at ca. 4.5μ. The yield of crude product melting at 276–278° C. is 138 g. Recrystallization of 45 g. of crude product from nitromethane gives 6 - (2 - furyl) - 1 - methyl - 1H-pyrazolo[3,4-d]pyrimidin-4(5H)-one as colorless needles melting at 278–280° C. (corr.).

Additional recrystallization raises the melting point to 283.5–285° C. (corr.).

*Analysis.*—Calcd. for $C_{10}H_8N_4O_2$: C, 55.55; H, 3.73; N, 25.92. Found: C, 55.49; H, 3.84; N, 25.84.

(C) *1 - methyl - 6 - (5 - nitro - 2 - furyl) - 1H-pyrazolo[3,4-d]pyrimidin - 4(5H) - one.*—101 g. (0.467 mole) of (B) is added in small portions with stirring to 300 ml. of concentrated sulfuric acid below 20° C. A solution of 50 ml. concentrated nitric acid in 50 ml. of concentrated sulfuric acid is added dropwise at 25–30° C. The temperature is kept at 25–30° for 1 hour following the addition. The reaction mixture is poured over 2 kg. of ice, and the excess acid neutralized by the addition of 2 N potassium hydroxide solution. The crude product is filtered, washed thoroughly with water, and dried at 65°

C. to give 65 g. (53.2%). Recrystallization from dilute aqueous dimethylformamide gives 1-methyl-6-(5-nitro-2-furyl)-1H-pyrazolo[3,4-d]pyrimidine-4(5H)-one as yellow needles decomposing at 325° C. (corr.).

Analysis.—Calcd. for $C_{10}H_7N_5O_4$: C, 45.98; H, 2.70; N, 26.81. Found: C, 46.23; H, 2.74; N, 26.84.

EXAMPLE VI

*1-ethyl-6-(5-nitro-2-furyl)-1H-pyrazolo[3,4-d]pyrimidin-4(5H)-one*

A. *N-(4-cyano-1-ethyl-5 - pyrazolyl)-2-furamide.*—To a solution of 196 g. (1.44 moles) of the compound of Example III, (A), in 600 ml. of pyradine is added dropwise during 15 minutes with stirring 196 g. (1.44 moles) of furoyl chloride. The resulting solution is heated on a steam bath for 4 hours, poured into 2 l. of ice water and neutralized by the addition of concentrated hydrochloric acid. After chilling the mixture thoroughly, the product is filtered, washed with water and dried at 65° C. The yield of product as colorless needles melting at 145–147° C. is 260 g. (78.8%). Recrystallization of 44 g. from dilute aqueous methanol gives 34.5 g. melting at 148.5–149.5° C. (corr.). Additional recrystallization raises the melting point to 149.5–150.5° C. (corr.).

Analysis.—Calcd. for $C_{11}H_{10}N_4O_2$: C, 57.38; H, 4.38; N, 24.34. Found: C, 57.41; H, 4.51; N, 24.37.

(B) *1-ethyl-6-(2-furyl)-1H-pyrazolo[3,4-d]pyrimidin-4(5H)-one.*— 216 g. (0.94 mole) of (A) is added in small portions to a warm stirred solution of 190 ml. of 30% hydrogen peroxide and 51 g. of sodium hydroxide in 2300 ml. of water. A few ml. of ethyl acetate is added periodically to control frothing. The solution is heated on a steam bath under reflux for 20 hours, chilled, and neutralized with glacial acetic acid. The solids are filtered, washed with cold water, and dried at 65° C. to give 146 g. The pulverized, crude product is stirred for several minutes in acetonitrile (500 ml.), filtered, and the residue dried at 65° C. This separation process is repeated until an infrared spectrum of the solids shows an absence of a nitrile band at ca. 4.5μ. The yield of crude 1-ethyl-6-(2-furyl) - 1H - pyrazolo[3,4 - d] - pyrimidin-4(5H)-one melting at 223–225° C. is 51 g. Recrystallization of 40 g. of crude product from 3 l. ethanol yields short colorless crystals melting at 255–257° C. (corr.) in a yield of 33 g.

Additional recrystallization from nitromethane raises the melting point to 260–261.5° C. (corr.).

Analysis.—Calcd. for $C_{11}H_{10}N_4O_2$: C, 57.38; H, 4.38; N, 24.34. Found: C, 57.36; H, 4.40; N, 24.56.

(C) *1-ethyl-6-(5-nitro-2-furyl)-1H-pyrazolo[3,4-d]pyrimidin-4(5H)-one.*—97.0 g. (0.42 mole) of (B) is added in small portions with stirring to 300 ml. of concentrated sulfuric acid below 15° C. A solution of 45 ml. of concentrated nitric acid in 50 ml. of concentrated sulfuric acid is added dropwise during 0.5 hour at 23–30° C. After stirring in the cold for 1 hour, following the addition, the reaction mixture is poured over 3 kg. of ice, and the excess acid is neutralized with 20 N potassium hydroxide solution. The crude product is filtered, washed thoroughly with water to remove inorganic salts, and recrystallized from dilute aqueous dimethylformamide. The product separates as yellow needles in a yield of 63.2 g. (54.5%) which upon additional recrystallization gives a melting point of 267–267.5° C. (corr.).

Analysis.—Calcd. for $C_{11}H_9N_5O_4$: C, 48.00; H, 3.30; N, 25.45. Found: C, 48.07; H, 3.13; N, 25.63.

EXAMPLE VII

*4-chloro-1-ethyl-6-(5-nitro-2-furyl)-1H-pyrazolo[3,4-d]pyrimidine*

A mixture of 390 g. (1.375 moles) of the compound of Example VI, (C), and 300 g. (1.44 moles) of phosphorus pentachloride in 2 l. of phosphorus oxychloride is refluxed with stirring for 3 hours. The solution is cooled, diluted with 2 l. of petroleum ether, and chilled thoroughly. The crude product is filtered, washed thoroughly with petroleum ether, and dried to give 341 g. (84.5%). Recrystallization of 40 g. from dilute aqueous dimethylformamide gives 4-chloro-1-ethyl-6-(5-nitro-2-furyl)-1H-pyrazolo[3,4-d]pyrimidine as pale yellow needles melting at 182–183° C. (corr.) in a yield of 34 g.

Additional recrystallization raises the melting point to 182.5–183.5° C. (corr.).

Analysis.—Calcd. for $C_{11}H_8ClN_5O_3$: C, 44.99; H, 2.74; N, 23.85. Found: C, 44.94; H, 2.62; N, 23.91.

EXAMPLE VIII

*1-ethyl-4-bis(2-hydroxyethyl)amino-6-(5-nitro-2-furyl)-1H-pyrazolo[3,4-d]pyrimidine*

A mixture of 49.6 g. (0.17 mole) of the compound of Example VII and 38 g. (0.36 mole) of diethanolamine in 400 ml. of methanol is refluxed with stirring for 2 hours. The solvent is removed in vacuo. After shaking the residue with 500 ml. of ice water, the crude product is filtered, washed with water, and recrystallized from dilute aqueous methanol. The 1-ethyl-4-bis(2-hydroxyethyl)amino-6-(5-nitro-2 - furyl)-1H-pyrazolo[3,4-d]pyrimidine product separates as yellow needles melting at 176–177° C. (corr.) in a yield of 38.0 g. (61.8%).

Analysis.—Calcd. for $C_{15}H_{18}N_6O_5$: C, 49.72; H, 5.01; N, 23.20. Found: C, 49.61; H, 5.12; N, 23.01.

EXAMPLE IX

*4-chloro-1-methyl-6-(5-nitro-2-furyl)-1H-pyrazolo[3,4-d]pyrimidine*

A mixture of 65 g. (0.25 mole) of the compound of Example V, (C), and 52 g. (0.25 mole) of phosphorus pentachloride in 300 ml. of phosphorus oxychloride is refluxed with stirring for 3 hours, cooled and diluted with 500 ml. of petroleum ether. After chilling the mixture thoroughly, the crude product is filtered, washed thoroughly with petroleum ether, and dried to give 50 g. (72.5%).

Recrystallization from dilute aqueous dimethylformamide gives 4-chloro-1-methyl - 6-(5-nitro-2-furyl)-1H-pyrazolo[3,4-d]pyrimidine as light yellow needles melting at 211–213° C. (corr.).

Analysis.—Calcd. for $C_{10}H_6ClN_5O_3$: C, 42.90; H, 2.16; Cl, 12.66. Found: C, 43.17; H, 2.38; Cl, 12.48.

EXAMPLE X

*4-bis(2-hydroxyethyl)amino-1-methyl-6-(5-nitro-2-furyl)-1H-pyrazolo[3,4-d]pyrimidine*

A mixture of 15.9 g. (0.057 mole) of the compound of Example IX and 12 g. (0.114 mole) of diethanolamine in 300 ml. of methanol is refluxed with stirring for 2 hours. The solvent is removed in vacuo. After shaking the residue with 300 ml. of ice water, the crude product is filtered, washed with water, and recrystallized from dilute aqueous methanol. The 4-bis(2-hydroxyethyl)amino-1-methyl-6-(5-nitro-2-furyl)-1H-pyrazolo[3,4-d]pyrimidine separates as yellow needles decomposing at 202–204° C. (corr.) in a yield of 13.7 g. (74%).

Recrystallization raises the decomposition point to 208–209° C. (corr.).

Analysis.—Calcd. for $C_{14}H_{16}N_6O_5$: C, 48.27; H, 4.63; N, 24.13. Found: C, 48.24; H, 4.78; N, 24.28.

EXAMPLE XI

*4-amino-1-methyl-6-(5-nitro-2-furyl)-1H-pyrazolo[3,4-d]pyrimidine*

A solution of 1.0 g. (0.0036 mole) of the compound of Example IX and 0.6 g. (0.0039 mole) of hexamethylenetetramine in 15 ml. of dimethylformamide is heated on a steam bath with stirring for 1 hour, diluted with 10 ml. of water and cooled. The crude product is filtered, washed with water, and recrystallized from dilute aqueous dimethylformamide. The 4-amino-1-methyl-6-(5-nitro-2-furyl)-1H-pyrazolo[3,4-d]pyrimidine separates as yellow needles decomposing at 345–346° C. (corr.) in a yield of 0.5 g. (42.6%).

EXAMPLE XII

*4-amino-1-ethyl-6-(5-nitro-2-furyl)-1H-pyrazolo-[3,4-d]pyrimidine*

A solution of 1.0 g. (0.0034 mole) of the compound of Example VII and 0.5 g. (0.0034 mole) of hexamethylenetetramine in 25 ml. of dimethylformamide is heated on a steam bath with stirring for 3 hours, diluted with 15 ml. of water, treated with charcoal and filtered. The filtrate is chilled thoroughly, and the crude product is filtered and washed with water. Recrystallization from dilute aqueous dimethylformamide gives 4-amino-1-ethyl-6-(5-nitro-2-furyl)-1H-pyrazolo[3,4-d]pyrimidine as yellow needles decomposing at 318–319° C. (corr.) in a yield of 0.2 g. (21.5%).

EXAMPLE XIII

*1-methyl-6-(5-nitro-2-furyl)-4-pyrrolidino-1H-pyrazolo[3,4-d]pyrimidine*

A stirred solution of 40.0 g. (0.143 mole) of the compound of Example IX and 20.5 g. (0.29 mole) of pyrrolidine in 500 ml. of methanol is refluxed for 3 hours, concentrated in vacuo to one-half volume, diluted with 500 ml. of water and chilled. The crude product is filtered and washed with cold water. Recrystallization from dilute aqueous dimethylformamide gives the product as yellow needles melting at 219–219.5° C. (corr.) in a yield of 32.2 g. (71.5%).

*Analysis.*—Calcd. for $C_{14}H_{14}N_6O_3$: C, 53.50; H, 4.49; N, 26.74. Found: C, 53.39; H, 4.37; N, 26.67.

EXAMPLE XIV

*4-[1-(2-hydroxyethyl)hydrazino]-1-methyl-6-(5-nitro-2-furyl)-1H-pyrazolo[3,4-d]primidine*

A solution of 40 g. (0.143 mole) of the compound of Example IX and 28 g. of hydroxyethylhydrazine in 400 ml. of methanol is refluxed with stirring for 3 hours, concentrated to one-half volume in vacuo, diluted with 500 ml. of water and chilled. The crude product is filtered and washed with cold water. Recrystallization from dilute aqueous dimethylformamide gives the product as yellow micro needles melting at 219–220° C. (corr.) in a yield of 35.6 g. (78%).

*Analysis.*—Calcd. for $C_{12}H_{13}N_7O_4$: C, 45.14; H. 4.10; N, 30.88. Found: C, 45.20; H, 3.98; N, 30.98.

EXAMPLE XV

*4-(2-hydroxyethylamino)-1-methyl-6-(5-nitro-2-furyl)-1H-pyrazolo[3,4-d]pyrimidine*

A solution of 38.0 g. (0.14 mole) of the compound of Example IX and 17.0 g. (0.28 mole) of ethanolamine in 300 ml. of methanol is refluxed with stirring for 5 hours, filtered, and the filtrate diluted with 250 ml. of water and chilled. The crude product is filtered and recrystallized from dilute aqueous methanol from which it separates as long yellow needles melting at 224–226° C. (corr.) in a yield of 30.6 g. (74%).

*Analysis.*—Calcd. for $C_{12}H_{12}N_6O_4$: C, 47.37; H, 3.98; N, 27.62. Found: C, 47.31; H, 3.94; N, 27.91.

EXAMPLE XVI

*4-[(2-methoxyethyl)amino]-1-methyl-6-(5-nitro-2-furyl)-1H-pyrazolo[3,4-d]pyrimidine*

A solution of 46 g. (0.165 mole) of the compound of Example IX and 25 g. (0.33 mole) of methoxyethylamine in 300 ml. of methanol is refluxed with stirring for 3 hours, diluted with 300 ml. of water, chilled and filtered. Recrystallization of the residue from acetonitrile gives the product as yellow needles melting at 182–184° C. (corr.) in a yield of 25.6 g. (48.8%).

*Analysis.*—Calcd. for $C_{13}H_{14}N_6O_4$: C, 49.05; H, 4.43; N, 26.41. Found: C, 49.08; H, 4.58; N, 26.37.

EXAMPLE XVII

*4-(3-methoxypropylamino)-1-methyl-6-(5-nitro-2-furyl)-1H-pyrazolo[3,4-d]pyrimidine*

A solution of 35.0 g. (0.125 mole) of the compound of Example IX and 23.0 g. (0.26 mole) of 3-methoxypropylamine in 300 ml. of methanol is refluxed with stirring for 3 hours, concentrated to one-half volume in vacuo, diluted with 300 ml. of water and chilled. The crude product is filtered and washed with water. Recrystallization from dilute aqueous dimethylformamide gives the product as yellow needles melting at 140–142° C. (corr.) in a yield of 30.9 g. (74.5%).

*Analysis.*—Calcd. for $C_{14}H_{16}N_6O_4$: C, 50.60; H, 4.85; N, 25.29. Found: C, 50.76; H, 4.91; N, 25.63.

EXAMPLE XVIII

*4-[2-hydroxyethyl(2-hydroxypropyl)amino]-1-methyl-6-(5-nitro-2-furyl)-1H-pyrazolo[3,4-d]pyrimidine*

A solution of 40.0 g. (0.143 mole) of the compound of Example IX and 34.5 g. (0.29 mole) of ethanolisopropanolamine in 450 ml. of methanol is refluxed with stirring for 3 hours, concentrated in vacuo to one-half volume, diluted with 500 ml. of water, and chilled thoroughly. The crude product is filtered and washed thoroughly with cold water. Recrystallization from dilute aqueous dimethylformamide gives the product as yellow needles melting at 221–222° C. (corr.) in a yield of 41.3 g. (80%).

*Analysis.*—Calcd. for $C_{15}H_{18}N_6O_5$: C, 49.72; H, 5.01; N, 23.20. Found: C, 49.71; H, 5.18; N, 23.15.

EXAMPLE XIX

*4[butyl(2-hydroxyethyl)amino]-1-methyl-6-(5-nitro-2-furyl)-1H-pyrazolo[3,4-d]-pyrimidine*

A solution of 35.0 g. (0.125 mole) of the compound of Example IX and 29.5 g. (0.252 mole) of N-butylethanolamine in 300 ml. of methanol is refluxed with stirring for 3 hours, concentrated in vacuo to one-half volume, diluted with 400 ml. of water, and chilled. The crude product is filtered and washed with water. Recrystallization from dilute aqueous dimethylformamide gives the product as yellow crystals melting at 145–147° C. (corr.) in a yield of 39.4 g. (87.5%).

*Analysis.*—Calcd. for $C_{16}H_{20}N_6O_4$: C, 53.32; H, 5.59; N, 23.32. Found: C, 53.50; H, 5.68; N, 23.40.

EXAMPLE XX

*4-(3-hydroxypropylamino)-1-methyl-6-(5-nitro-2-furyl)-1H-pyrazolo[3,4-d]pyrimidine*

A solution of 40.0 g. (0.14 mole) of the compound of Example IX and 21.0 g. (0.28 mole) of 3-aminopropanol in 500 ml. of methanol is refluxed with stirring for 3 hours, concentrated in vacuo to one-half volume, diluted with 500 ml. of water and chilled. The crude product is filtered and washed with cold water. Recrystallization from dilute aqueous dimethylformamide gives the product as yellow needles melting at 209–211° C. (corr.) in a yield of 37.4 g. (82.3%).

Further recrystallization raises the melting point to 216–217° C. (corr.).

*Analysis.*—Calcd. for $C_{14}H_{14}N_6O_3$: C, 53.50; H, 4.49; N, 26.74. Found: C, 53.39; H, 4.37; N, 26.67.

EXAMPLE XXI

*4-bis(2-ethoxyethyl)amino-1-methyl-6-(5-nitro-2-furyl)-1H-pyrazolo[3,4-d]pyrimidine*

A solution of 40 g. (0.143 mole) of the compound of Example IX and 47 g. (0.29 mole) of bisethoxyethylamine in 300 ml. of methanol is refluxed with stirring for 2.5 hours, chilled and diluted with 200 ml. of water. The product is filtered, washed with water and recrystallized from dilute aqueous methanol. The product separates as yellow needles melting at 107.5–108° C. (corr.) in a yield of 32.2 g. (55.5%).

*Analysis.*—Calcd. for $C_{18}H_{24}N_6O_5$: C, 53.45; H, 5.98; N, 20.78. Found: C, 53.14; H, 5.90; N, 20.81.

EXAMPLE XXII

*4-[(2-hydroxyethyl)(methyl)amino]-1-methyl-6-(5-nitro-2-furyl)-1H-pyrazolo[3,4-d]-pyrimidine*

A solution of 50.0 g. (0.18 mole) of the compound of Example IX and 27.0 g. (0.36 mole) of N-methylethanolamine in 500 ml. of methanol is refluxed with stirring for 3 hours, concentrated in vacuo to about one-half the original volume, diluted with 500 ml. water and chilled thoroughly. The product is filtered, washed with water and recrystallized from dilute aqueous dimethylformamide from which the product separates as yellow crystals melting at 203–205° C. (corr.) in a yield of 47.1 g. (84.4%).

*Analysis.*—Calcd. for $C_{13}H_{14}N_6O_4$: C, 49.05; H, 4.43; N, 26.41. Found: C, 49.17; H, 4.28; N, 26.48.

EXAMPLE XXIII

*1-ethyl-4-(2-methoxyethyl)amino-6-(5-nitro-2-furyl)-1H-pyrazolo[3,4-]pyrimidine*

A 2-l., three-neck flask, fitted with a stirrer, condenser and stopper, is charged with 45 g. (0.153 mole) of the compound of Example VII and 36 g. (0.31 mole) of 60–70% methoxyethylamine solution in 1 l. of methyl alcohol. The solution is refluxed with stirring for 4 hours. The solvents are removed in vacuo and the residue is slurried in water. The crude product is collected by filtration and recrystallized from methyl alcohol. The product separates as yellow needles melting at 145–147° C. (corr.) in a yield of 29 g. (58%).

*Analysis.*—Calcd. for $C_{14}H_{16}N_6O_4$: C, 50.60; H, 4.85; N, 25.29. Found: C, 50.36; H, 4.72; N, 25.36.

EXAMPLE XXIV

*1-ethyl-4-(2-hydroxyethylamino)-6-(5-nitro-2-furyl)-1H-pyrazolo[3,4-d]pyrimidine*

A 2-l., three-neck flask, fitted with a condenser and a stirrer, is charged with 45 g. (0.153 mole) of the compound of Example VII and 19 g. (0.31 mole) of ethanolamine in 1 l. of methyl alcohol. The mixture is refluxed with stirring for 4 hours. The solvents are removed in vacuo and the residue is slurried with water. The crude product is collected by filtration and recrystallized from methyl alcohol. The product separates as yellow needles melting at 185–187° C. (corr.) in a yield of 35 g. (72%).

*Analysis.*—Calcd. for $C_{13}H_{14}N_6O_4$: C, 49.05; H, 4.43; N, 26.41. Found: C, 49.10; H, 4.27; N, 26.45.

EXAMPLE XXV

*1-ethyl-4-[3-(4-morpholino)propyl]amino-6-(5-nitro-2-furyl)-1H-pyrazolo[3,4-d]-pyrimidine hydrochloride*

A 2-l., three-neck flask, fitted with a stirrer, condenser and a stopper, is charged with 45 g. (0.153 mole) of compound of Example VII and 45 g. (0.31 mole) of morpholino-propylamine in 1 l. of methyl alcohol. The solution is refluxed with stirring for 3 hours. The solvents are removed in vacuo and the residue is slurried in slightly basic water solution. The solid is collected by filtration and is suspended in 500 ml. of methyl alcohol. The suspension is treated with bubbling anhydrous hydrogen chloride until a solution occurs. The solution is filtered and chilled. The crude product is collected by filtration and recrystallized from methyl alcohol. The product separates as yellow needles melting at 260° C. dec. (corr.) in a yield of 29 g. (43.5%).

*Analysis.*—Calcd. for $C_{18}H_{23}N_7O_4 \cdot HCl$: C, 49.37; H, 5.52; N, 22.39. Found: C, 49.42; H, 5.67; N, 22.09.

EXAMPLE XXVI

*1-ethyl-4-[(2-hydroxyethyl)methylamino]-6-(5-nitro-2-furyl)-1H-pyrazolo-[3,4-d]-pyrimidine*

A 2-l., three-neck flask, fitted with a stirrer, condenser and stopper, is charged with 45 g. (0.153 mole) of the compound of Example VII and 23.3 g. (0.31 mole) of N-methylethanolamine in 1 l. of methyl alcohol. The mixture is refluxed with stirring for 4 hours. The solvents are removed in vacuo and the residue is slurried in water. The crude product is collected by filtration and recrystallized from acetonitrile. The product separates as yellow needles melting at 186–188° C. (corr.) in a yield of 40 g. (80%).

*Analysis.*—Calcd. for $C_{14}H_{16}N_6O_4$: C, 50.60; H, 4.85; N, 25.29. Found: C, 50.65; H, 5.07; N, 25.23.

EXAMPLE XXVII

*1-ethyl-4-[2-hydroxyethyl(2-hydroxypropyl)amino]-6-(5-nitro-2-furyl)-1H-pyrazolo-[3,4-d]pyrimidine*

A stirred solution of 45 g. (0.153 mole) of the compound of Example VII and 37 g. (0.31 mole) of ethanolisopropanolamine in 1 l. of methanol is refluxed for 3 hours. The solvents are stripped in vacuo and the gummy residue shaken with 500 ml. of ice water. The crystalline product is filtered, washed with water and recrystallized from dilute aqueous methanol. The product separates as yellow needles melting at 143–145° C. (corr.) in a yield of 43.8 g. (76%).

*Analysis.*—Calcd. for $C_{16}H_{20}N_6O_5$: C, 51.06; H, 5.36; N, 22.33. Found: C, 51.01; H, 5.16; N, 22.15.

EXAMPLE XXVIII

*1-ethyl-4-bis(2-hydroxypropyl)amino-6-(5-nitro-2-furyl)-1H-pyrazolo[3,4-d]pyrimidine*

A 2-l. three-neck flask fitted with a stirrer, condenser and stopper is charged with 42.5 g. (0.145 mole) of the compound of Example VII and 40 g. (0.3 mole) of diisopropanolamine in 1 l. of methyl alcohol. The mixture is heated at reflux for 3 hours. After removing the solvents in vacuo on a steam bath, the solid residue is slurried in water. The crude product is collected by filtration and recrystallized from dilute aqueous dimethylformamide. The product separates as yellow needles melting at 210–212° C. in a yield of 24 g. (42.5%).

Further recrystallizations from dilute aqueous dimethylformamide raises the melting point to 227–229° C. (corr.).

*Analysis.*—Calcd. for $C_{17}H_{22}N_6O_5$: C, 52.30; H, 5.68; N, 21.53. Found: C, 52.12; H, 5.60; N, 21.49.

EXAMPLE XXIX

*1-(2-methoxyethyl)-6-(5-nitro-2-furyl)-1H-pyrazolo[3,4-d]pyrimidin-4-(5H)-one*

(A) *N[4 - cyano - 1 - (2 - methoxyethyl) - 5 - pyrazoyl]-2-furamide.*—To a solution of 901 g. (5.43 moles) of the compound of Example IV, (A), of 2 l. of pyridine is added cautiously with stirring 740 g. (5.68 moles) of furoyl chloride. After heating on a steam bath for 4 hours the solution is poured into 10 l. of ice water and allowed to stand. The crude product is collected by filtration as colorless platelets melting at 95–100° C. in a yield of 860 g. (61%). Recrystallization from dilute aqueous ethanol raises the melting point to 101–103° C.

*Analysis.*—Calcd. for $C_{12}H_{12}N_4O_3$: C, 55.38; H, 4.65; N, 21.53. Found: C, 55.36; H, 4.57; N, 21.60.

(B) *6-(2-furyl)-1-(2-methoxyethyl)-1H-pyrazolo[3,4-d]pyrimidin-4(5H)-one.*—A 6-l., three-neck flask fitted with a stirrer, condenser and stopper is charged with 510 g. of sodium hydroxide in 2 l. of water and 850 ml. of 30% hydrogen peroxide. To this warm solution is added 287 g. (1.07 moles) of (A) above in small portions. The solution is heated on a steam bath under reflux for 4 hours. The solution is cooled and neutralized with glacial acetic acid. The solids are filtered, washed with water and dried at 60° C. The yield of crude product is 195 g. (70%). Recrystallization of 60 g. of crude product from ethanol gives colorless needles melting at 200–202° C. (corr.) in a yield of 35 g.

*Analysis.*—Calcd. for $C_{12}H_{12}N_4O_3$: C, 55.38; H, 4.65; N, 21.53. Found: C, 55.49; H, 4.74; N, 21.41.

(C) *1-(2-methoxyethyl)-6-(5-nitro-2-furyl)-1H-pyrazolo[3,4-d]-pyrimidin-4(5H)-one.*—A 2-l., three-neck flask, fitted with a stirrer, Y-tube, thermometer and dropping funnel is charged with 600 ml. of concentrated sulfuric acid. To this is added in small portions, below 30° C., 200 g. (0.80 mole) of (B) above. A solution of 95 ml. of concentrated sulfuric acid and 87 ml. of concentrated nitric acid is added dropwise at 25–30° C. during 1 hour. After allowing the mixture to stir for 1 hour below 30° C., it is poured into 6 l. of ice water. The crude product is collected by filtration. The wet filter cake is slurried in water and neutralized by the addition of aqueous sodium carbonate solution. The cream-colored product melting at 240–243° C. is filtered and rinsed with water to yield 110 g. (45%). Recrystallization from dilute aqueous dimethylformamide raises the melting point to 243–245° C. (corr.).

*Analysis.*—Calcd. for $C_{12}H_{11}N_5O_5$: C, 47.21; H, 3.63; N, 22.95. Found: C, 47.17; H, 3.84; N, 23.07.

EXAMPLE XXX

*4-chloro-1-(2-methoxyethyl)-6-(5-nitro-2-furyl)-1H-pyrazolo-[3,4-d]pyrimidine*

A 3-l. three-neck flask fitted with a condenser, stirrer and stopper is charged with 300 g. (0.95 mole) of the compound of Example XXIX, (C), and 260 g. of phosphorus pentachloride in 1100 ml. of phosphorus oxychloride. The mixture is heated at reflux for 3 hours. The reaction mixture is cooled and the product collected by filtration. The product is washed with benzene and petroleum ether. The yield of colorless platelets melting at 152–156° is 235 g. (70%).

*Analysis.*—Calcd. for $C_{12}H_{10}ClN_5O_4$: C, 44.52; H, 3.11; N, 21.64. Found: C, 44.73; H, 3.13; N, 21.71.

EXAMPLE XXXI

*1-(2-methoxyethyl)-4-(2-methoxyethylamino)-6-(5-nitro-2-furyl)-1H-pyrazolo[3,4-d]-pyrimidine*

A 2 l. three-neck flask fitted with a stirrer, condenser, and stopper is charged with 40 g. (0.125 mole) of the compound of Example XXX and 28 g. (0.27 mole) of 70% aqueous methoxyethylamine in 1 l. of methyl alcohol. The mixture is refluxed for 3 hours. The solution is concentrated in vacuo on a steam bath until the product begins to separate. The mixture is diluted with water and cooled. The crude product is collected by filtration and recrystallized from methyl alcohol. The product separates as yellow needles melting at 109–111° C. in a yield of 32 g. (71%).

*Analysis.*—Calcd. for $C_{15}H_{18}N_6O_5$: C, 49.72; H, 5.01; N, 23.20. Found: C, 49.85; H, 5.12; N, 23.12.

EXAMPLE XXXII

*4-(2-hydroxyethyl)amino-1-(2-methoxyethyl)-6-(5-nitro-2-furyl)1H-pyrazolo[3,4-d]-pyrimidine*

A 2 l. three-neck flask, fitted with a stirrer, condenser and stopper, is charged with 40 g. (0.125 mole) of the compound of Example XXX and 16 g. (0.27 mole) of hydroxyethylamine in 1 l. of methyl alcohol. The mixture is refluxed for 3 hours. The solution is concentrated in vacuo on a steam bath until the product begins to separate. The mixture is diluted with water and cooled. The crude product is collected by filtration and recrystallized from methyl alcohol. The product separates as yellow needles melting at 200–203° C. in a yield of 40 g. (92%).

*Analysis.*—Calcd. for $C_{14}H_{16}N_6O_5$: C, 48.27; H, 4.63; N, 24.13. Found: C, 48.14; H, 4.61; N, 24.27.

EXAMPLE XXXIII

*4-bis(2-hydroxyethyl)amino-1-(2-methoxyethyl)-6-(5-nitro-2-furyl)-1H-pyrazolo[3,4-d]pyrimidine*

A 2 l. three-neck flask, fitted with a stirrer, condenser and stopper, is charged with 40 g. (0.125 mole) of the compound of Example XXX and 28.5 g. (0.27 mole) of diethanolamine in 1 l. of methyl alcohol. The reaction mixture is refluxed for 2–3 hours. The volume of the mixture is concentrated to about 100 ml. in vacuo on a steam bath. After dilution of the residue with water, the crude product is collected by filtration and recrystallized from methyl alcohol. The product separates as bright yellow needles melting at 163–165° C. (corr.) in a yield of 41 g. (86%).

*Analysis.*—Calcd. for $C_{16}H_{20}N_6O_6$: C, 48.97; H, 5.14; N, 21.42. Found: C, 49.04; H, 5.18; N, 21.45.

EXAMPLE XXXIV

*4-[2-hydroxyethyl(2-hydroxypropyl)amino]-1-(2-methoxyethyl)-6-(5-nitro-2-furyl)-1H-pyrazolo[3,4-d]pyrimidine*

A 2 l. three-neck flask fitted with a stirrer, condenser and stopper is charged with 40 g. (0.125 mole) of the compound of Example XXX and 32 g. (0.27 mole) of ethanolisopropanolamine in 1 l. of methyl alcohol. The mixture is refluxed for 3 hours. The solvents are removed in vacuo on a steam bath and the residue is slurried in water. The crude product is collected by filtration and recrystallized from dilute aqueous ethanol. The product separates as yellow needles melting at 148–149° C. (corr.) in a yield of 48 g. (94%).

*Analysis.*—Calcd. for $C_{17}H_{22}N_6O_6$: C, 50.24; H, 5.46; N, 20.68. Found: C, 50.36; H, 5.59; N, 20.51.

EXAMPLE XXXV

*4-bis(2-hydroxypropyl)amino-1-(2-methoxyethyl)-6-(5-nitro-2-furyl)1H-pyrazolo[3,4-d]pyrimidine*

A 2-l. three-neck flask fitted with a condenser, stirrer and stopper is charged with 40 g. (0.125 mole) of the compound of Example XXX and 36 g. (0.27 mole) of bis-2-hydroxy-propylamine in 1 l. of methyl alcohol. The mixture is refluxed for 3 hours. The solution is concentrated until the product begins to separate. The mixture is diluted with water and cooled. The crude product is collected by filtration and recrystallized from ethanol. The product separates as yellow needles melting at 186–188° C. (corr.) in a yield of 34 g. (65%).

Recrystallization from ethanol raises the melting point to 188–190° C. (corr.)

*Analysis.*—Calcd. for $C_{18}H_{24}N_6O_6$: C, 51.42; H, 5.75; N, 19.99. Found: C, 51.43; H, 5.88; N, 19.87.

What is claimed is:

1. The compound 1-methyl-6-(5-nitro-2-furyl)-4-pyrrolidino-1H-pyrazolo[3,4-d]pyrimidine of the formula:

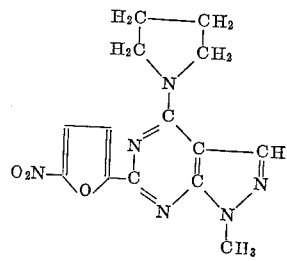

2. The compound 1-methyl-6-(5-nitro-2-furyl)-4-[1-(2-hydroxyethyl)hydrazino]-1H-pyrazolo[3,4-d]pyrimidine of the formula:

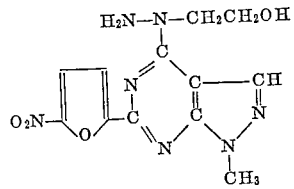

3. The compound 4-[2-methoxyethyl)amino]-1-methyl-6-(5-nitro-2-furyl)-1H-pyrazolo[3,4-d]pyrimidine of the formula:

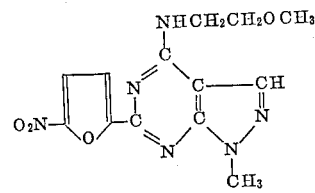

4. The compound 4-[butyl-(2-hydroxyethyl)amino]-1-methyl-6-(5-nitro-2-furyl)-1H-pyrazolo[3,4-d]pyrimidine of the formula:

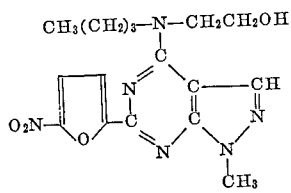

5. The compound 4-bis(2-ethoxyethyl)amino-1-methyl-6-(5-nitro-2-furyl)-1H-pyrazolo[3,4-d]pyrimidine of the formula:

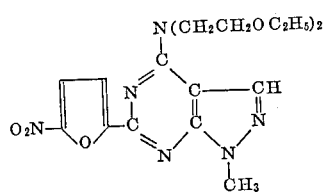

6. The compound 1-ethyl-4-(2-methoxyethyl)-6-(5-nitro-2-furyl)-1H-pyrazolo[3,4-d]pyrimidine of the formula:

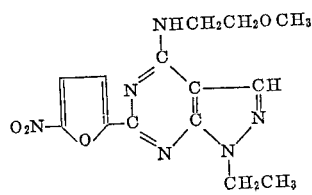

7. The compound 1-ethyl-4-[3-(morpholino)propyl]amino-6-(5-nitro-2-furyl)-1H-pyrazolo[3,4-d]pyrimidine hydrochloride of the formula:

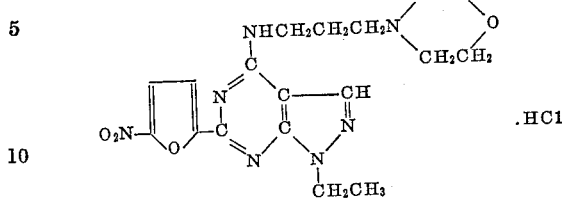

8. The compound 1-(2-methoxyethyl)-4-(2-methoxyethylamino)-6-(5-nitro-2-furyl)-1H-pyrazolo[3,4-d]pyrimidine of the formula:

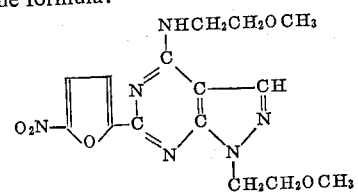

9. A compound of the formula:

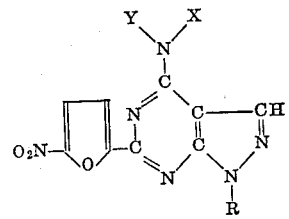

wherein
R is a member of the group consisting of lower alkyl and methoxyethyl;
X is a member of the group consisting of hydrogen, amino, loweralkyl, hydroxyethyl, 2-hydroxypropyl and loweralkoxyloweralkyl;
Y is a member of the group consisting of hydroxypropyl, loweralkoxylloweralkyl and 3-(morpholinopropyl); and
X and Y taken together with N is pyrrolidino.

10. The compound 4-(3-hydroxypropylamino)-1-methyl-6-(5-nitro-2-furyl)-1H-pyrazolo[3,4-d]pyrimidine of the formula:

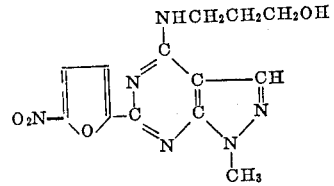

References Cited

FOREIGN PATENTS 937,725  9/1963  Great Britain.

ALEX MAZEL, *Primary Examiner.*

J. TOVAR, *Assistant Examiner.*